(12) United States Patent
Fickett

(10) Patent No.: US 6,843,380 B1
(45) Date of Patent: Jan. 18, 2005

(54) PORTABLE MODULAR STORAGE SUPPORT DEVICE

(76) Inventor: Glenn A. Fickett, 819 W. 22nd St., #4, Tempe, AZ (US) 85282

(*) Notice: Subject to any disclaimer, the term of this patent is extended or adjusted under 35 U.S.C. 154(b) by 2 days.

(21) Appl. No.: 10/043,420

(22) Filed: Jan. 10, 2002

Related U.S. Application Data

(63) Continuation-in-part of application No. 09/653,834, filed on Sep. 1, 2000, now abandoned, which is a continuation-in-part of application No. 29/115,420, filed on Dec. 14, 1999, now Pat. No. Des. 437,164.

(51) Int. Cl.⁷ .................................................. A47F 7/00
(52) U.S. Cl. ............................. 211/22; 211/17; D6/566
(58) Field of Search .......................... D6/566; 403/400, 403/218, 219, 170, 384, 385, 386, 399; 211/17, 18, 20, 22, 24, 182

(56) References Cited

U.S. PATENT DOCUMENTS

| | | | |
|---|---|---|---|
| 369,143 A | * 8/1887 | White .......................... 403/55 |
| 615,995 A | 12/1898 | Leonard |
| 1,190,502 A | * 7/1916 | Anderson .................... 403/146 |
| 1,502,418 A | * 7/1924 | Arnstein ...................... 403/400 |
| 1,667,669 A | 4/1928 | Megee |
| 2,745,181 A | * 5/1956 | Czerniewicz ............... 33/27.03 |
| 2,767,003 A | * 10/1956 | Gilmont ...................... 403/385 |
| 2,835,503 A | 5/1958 | Humphries et al. |
| 3,637,186 A | * 1/1972 | Greenfield, deceased ... 248/478 |
| 3,765,634 A | * 10/1973 | Stempel ....................... 248/250 |
| 3,804,432 A | 4/1974 | Lehram |
| 3,981,491 A | 9/1976 | Snyder |
| 3,998,476 A | 12/1976 | Kazmark, Sr. |
| 4,037,858 A | 7/1977 | Adams |
| 4,101,107 A | * 7/1978 | Antoszewski ............ 248/218.4 |
| 4,294,561 A | * 10/1981 | Chapman et al. ........... 403/219 |
| 4,348,034 A | 9/1982 | Welt |
| 4,433,935 A | * 2/1984 | Main et al. .................. 403/385 |
| 4,523,773 A | 6/1985 | Holtz |
| 4,550,835 A | * 11/1985 | Lynch .......................... 211/24 |
| 4,618,035 A | 10/1986 | Mao |
| 4,807,837 A | 2/1989 | Gawlik et al. |
| 5,050,785 A | 9/1991 | Hays |
| 5,078,276 A | 1/1992 | Rogge et al. |
| 5,083,729 A | * 1/1992 | Saeks et al. .................. 211/22 |

(List continued on next page.)

FOREIGN PATENT DOCUMENTS

| | | |
|---|---|---|
| EP | 0597150 | 5/1994 |
| FR | 2458444 | 1/1981 |
| FR | 2711109 | 4/1995 |
| GB | 14740 | 8/1895 |
| WO | WO 99/33695 | 7/1999 |

Primary Examiner—Leslie A. Braun
Assistant Examiner—Khoa Tran
(74) Attorney, Agent, or Firm—Frank J. McGue

(57) ABSTRACT

A modular storage support device supports items suspended above a floor. The device rests upon the floor and comprises a vertical member extending upwardly which has an upper end and a lower end. A base member has a base vertical portion which receives the lower end of the vertical member and a U-shaped portion which is oriented perpendicular to the vertical member. The U-shaped portion has two leg portions extending laterally with respect to the sides thereof. Two L-shaped support legs are received in one of the leg portions and extend forward therefrom. A foot portion extends downwardly from each of the L-shaped support legs to rest upon a floor. An L-shaped wall brace is received within the upper end of the vertical member and extends upwardly and then rearwardly from vertical member to engage a vertical wall. One or more supports are sildably secured to the vertical member and the upwardly extending section of the L-shaped wall brace. Each of the one or more supports have at least one support arm being mounted thereto. Each of the at least one support arms is parallel to, shorter than and positioned between the support legs and engages an item for support of said item.

2 Claims, 9 Drawing Sheets

U.S. PATENT DOCUMENTS

| | | | |
|---|---|---|---|
| 5,161,768 A | | 11/1992 | Sarabin |
| 5,222,707 A | | 6/1993 | Myers |
| 5,238,125 A | * | 8/1993 | Smith .............................. 211/5 |
| D344,868 S | * | 3/1994 | Martinell ..................... D6/552 |
| 5,332,104 A | * | 7/1994 | Santella ....................... 211/18 |
| 5,335,782 A | * | 8/1994 | Herzog ................... 198/836.3 |
| 5,458,305 A | | 10/1995 | Woodward |
| 5,477,789 A | | 12/1995 | Von Gunten |
| 5,501,544 A | * | 3/1996 | Cairns ........................ 403/400 |
| 5,642,820 A | | 7/1997 | Angeles |
| 5,758,851 A | * | 6/1998 | Remmers .................... 248/251 |
| 5,794,828 A | | 8/1998 | Colan et al. |
| 5,797,695 A | * | 8/1998 | Prusmack .................. 403/170 |
| 5,842,581 A | | 12/1998 | Graefe |
| D417,353 S | * | 12/1999 | Laga ........................... D6/566 |
| D437,164 S | | 2/2001 | Fickett |
| 6,305,037 B1 | * | 10/2001 | Cheng .......................... 5/99.1 |
| 6,396,015 B1 | * | 5/2002 | Ko .............................. 200/529 |

\* cited by examiner

PORTABLE MODULAR STORAGE SUPPORT DEVICE

RELATED APPLICATION

This is a continuation-in-part of patent application Ser. No. 09/653,834 filed Sep. 1, 2000 now abandoned, which is a continuation-in-part of design patent application Ser. No. 29/115,420 filed on Dec. 14, 1999, now U.S. Pat. No. D437,164.

TECHNICAL FIELD

This invention relates in general to a modular storage support device, and, and, more particularly, to a portable device having a modular format which is easily transported and assembled.

BACKGROUND OF THE INVENTION

Many individuals prefer to store items off the floor to minimize space requirements and the like. However, most such storage devices require permanent installation which may be impractical or undesirable as in an hotel apartment or condominium setting. In addition, most such structures have a particular configuration which cannot be altered as an individual's needs change. Thus, it is desirable to have a support structure which is easily assembled, portable, and does not demand permanent structure, and, when disassembled, takes up only minimal space. Further, another desireable feature is a modular nature to allow such support structures to be easily customized for a particular user and altered as that user's needs change over time.

U.S. Pat. No. 5,642,820 entitled "Portable Storage Support Structure" which issued on Jul. 1, 1997 to Angeles discloses a bicycle support structure adapted for resting on a floor and leaning against a wall.

U.S. Pat. No. 615,995 entitled "Bicycle Support" which issued on Dec. 13, 1898 to Leonard shows a free standing bicycle support having several sets of arms K extending from a vertical pole F. Hooks P are at the end of the arms K.

U.S. Pat. No. 5,222,707 entitled "Portable Bicycle Repair Stand" which issued on Jun. 29, 1993 to Myers shows a portable bicycle repair stand which may be attached to a vertical surface via suction cup devices 23.

U.S. Pat. No. 3,981,491 entitled "Work Stand For Bicycles" which issued on Sep. 21, 1976 to Snyder provides a free standing work stand for bicycles comprising a vertical support assembly with angular feet 14.

U.S. Pat. No. 5,477,789 entitled "Shelf Structure" which issued on Dec. 26, 1995 to Von Gunten shows a shelf structure supported on a floor and against a wall with no mechanical connections between a post and the wall or floor.

None of the known prior art disclose the device set forth herein

SUMMARY OF THE INVENTION

It is an object of this invention to provide a modular support structure which is easily assembled, portable, and does not demand permanent structure.

It is a further object of this invention to provide a modular support structure which is easily disassembled and, when disassembled, takes up minimal space.

It is still another object to provide a modular support structure which is modular in nature thereby allowing users to easily customize a structure and to alter the structure as that user's needs change over time.

Further objects and advantages of the invention will become apparent as the following description proceeds and the features of novelty which characterize this invention will be pointed out with particularity in the claims annexed to and forming a part of this specification

BRIEF DESCRIPTION OF THE DRAWINGS

The present invention may be more readily described by reference to the accompanying drawings in which.

DESCRIPTION OF THE PREFERRED EMBODIMENT

Figure 1:
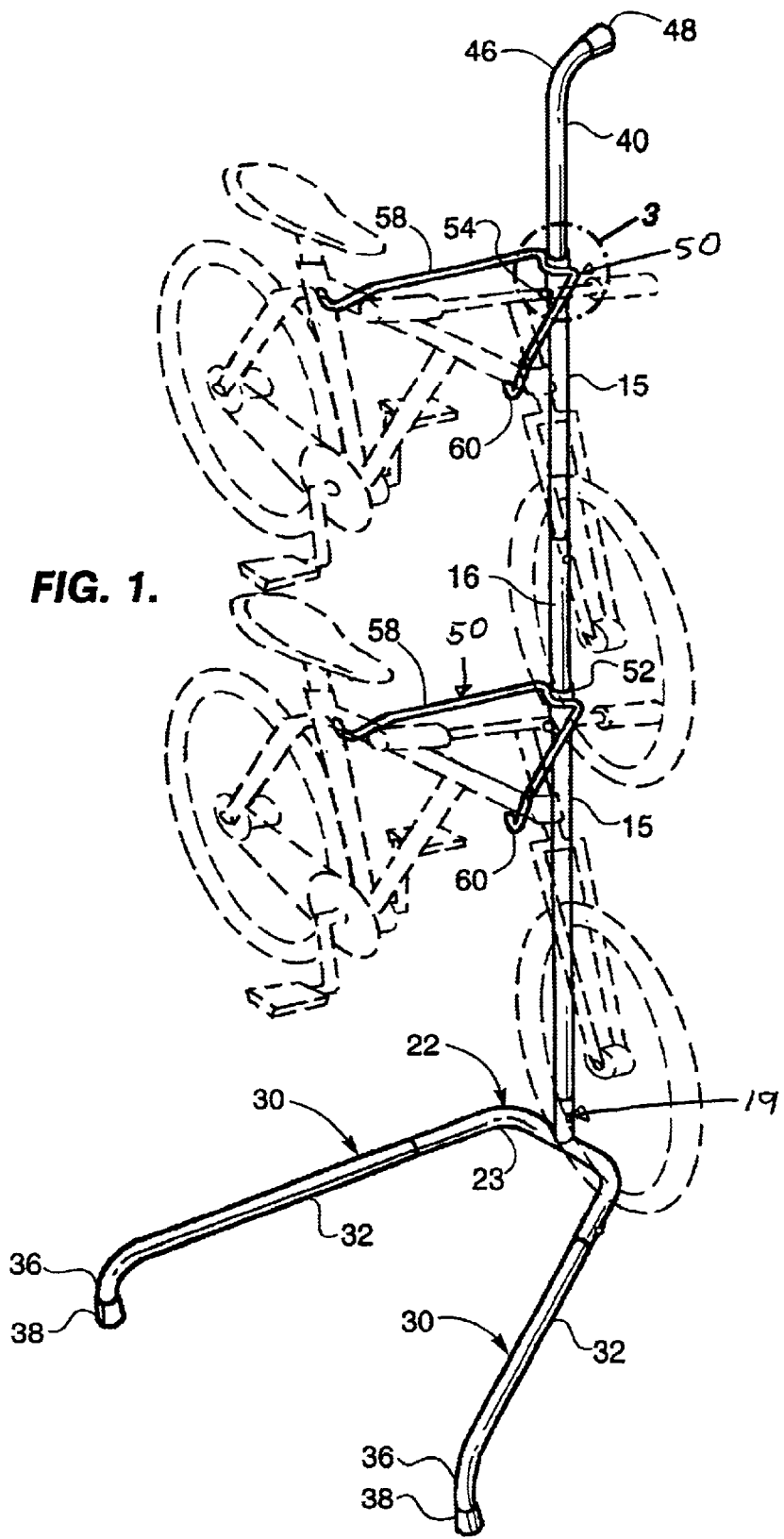
FIG. 1 is a perspective view of a module used as a support structure of the present invention designed to support a pair of bicycles.

A modular storage support device 10 supports differing items suspended above a floor 12. Device 10 rests upon floor 12 and comprises a vertical member 16 extending upwardly which has an upper end 18 and a lower end 20. A base member 22 has a base vertical portion 21 which receives lower end 20 of vertical member 16 and a U-shaped portion 23 which is oriented perpendicular to vertical member 16. U-shaped portion 23 has two leg portions 27 extending laterally with respect to the sides thereof. Two L-shaped support legs 30 are received in a respective one of leg portions 27 and extend forward therefrom. A foot portion 36 extends downwardly from each L-shaped support leg 30 to rest upon floor 12. An L-shaped wall brace 40 is received within upper end 18 of vertical member 16 and extends upwardly and then rearwardly from vertical member 16 to engage a vertical wall 14. One or more supports 49 are slidably secured to vertical member 16 and upwardly extending section of L-shaped wall brace 40. Each of the one or more supports 49 have at least one arm 51 being mounted thereto. Each of the at least one arms 51 is parallel to, shorter than and positioned above and between L-shaped support legs 30 and engages an item for support of said item.

Figure 3:
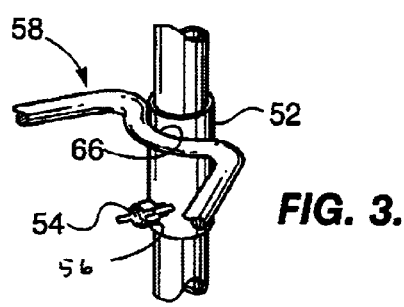
FIG. 3 is a close up view of the circled area 3 in FIG. 1.
Figure 4:
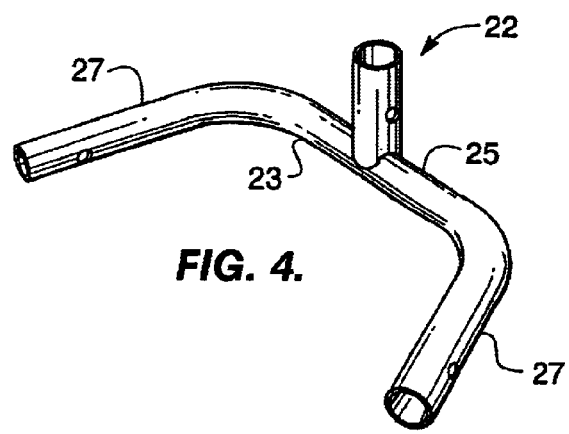
FIG. 4 is a perspective view of a base member employed in the present invention.
Figure 2:
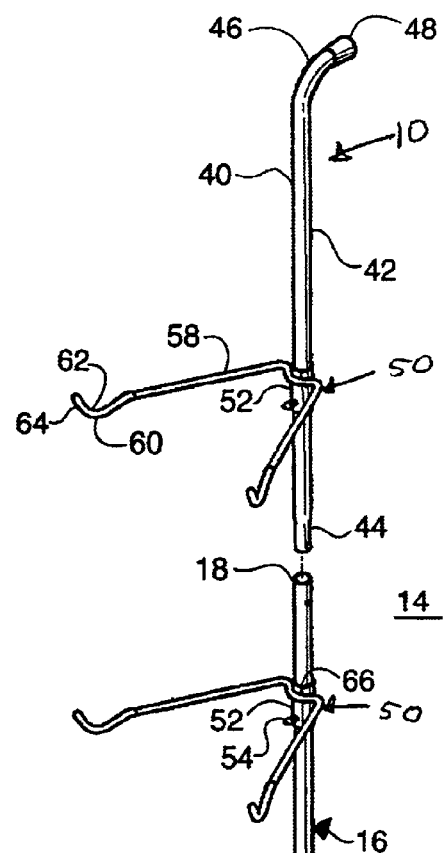
FIG. 2 is an exploded view of an alternate embodiment of the structure shown in FIG. 1.
Figure 2:
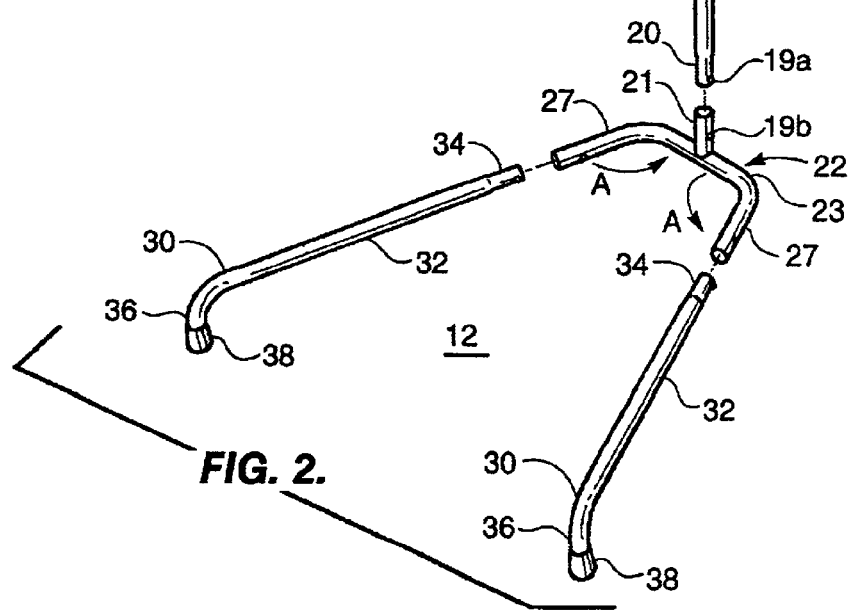

One embodiment of device 10 of the present invention is best seen in FIGS. 1–3 and is adapted for supporting one or two bicycles (shown in shadow) suspended above floor 12. In addition to resting on floor 12, device 10 leans against vertical wall 14. As shown, device 10 is comprised of round tubing though those skilled in the art will recognize that other material, for example, square tubing, can be utilized.

As shown, vertical member 16 of device 10 includes at least one vertical portion 15 whose major axes are oriented vertically. Each vertical portion 15 has an upper end 18 and a narrowed lower end 20. The narrowed lower end 20 is telescopically received within the upper end 18 of an abutting vertical portion 15 whereby in combination the three vertical portions 15 result in vertical member 16. A snap 19 comprising snap pin 19a in lower end 20 mating with a corresponding hole 19b in upper end 18 is preferably used to secure one vertical portion 15 to an abutting vertical portion 15. Once secured, simply depressing snap pin 19a disengages vertical portions 15.

It will be understood by those skilled in the art that the number of vertical portions 15 is not critical to the invention, that vertical member 16 can consist of one or as many vertical portions 15 as desired. The choice of three vertical portions 15 in the illustrated embodiment is for minimizing the length of the packaging containing the goods and is not critical for purposes of the invention.

Device 10 further comprises base member 22 which includes a base vertical portion 21 which telescopically receives lower end 20 of vertical member 16. Another snap 19 comprising snap pin 19a in lower end 20 mating with a corresponding hole 19b in base vertical portion 21 is preferably used to secure vertical member 16 to base member 22. Once secured, simply depressing snap pin 19a disengages vertical member 16 and base member 22.

Extending horizontally from base vertical portion 21 is generally U-shaped portion 23 having a base portion 25 generally oriented horizontally and parallel to wall 14 and two leg portions 27 also extending generally horizontally but extend laterally at an angle from wall 14 on one side of vertical member 16. In the preferred embodiment, leg portions 27 are not perpendicular to wall 14 but extend at an angle A from base portion 25. In the most preferred embodiment, angle A is about 113°.

Device 10 further includes the two L-shaped support legs 30 having a horizontally oriented elongated portion 32 having a narrowed wall end 34 telescopically received in leg portions 27 and extending therefrom and foot portion 36 extending downwardly from elongated portion 32 to rest upon floor 12. Snaps 19 are used to secure support legs 30 to base member 22 as previously described. In addition, caps 38 are provided for the end of foot portions 36 engaging floor 12 to prevent scratching of same when device 10 is assembled as well as frictional engagement therewith.

Device 10 further comprises L-shaped wall brace 40 having an elongated vertical portion 42 having a narrowed lower end 44 telescopically received within upper end 18 and extending upwardly therefrom and a wall brace portion 46 extending directly opposite support legs 30 from elongated vertical portion 42 to engage wall 14. Snaps 19 are also used to releasably secure wall brace 40 to vertical member 16 as previously described while a third cap 48 is provided for the end of wall brace portion 46 engaging wall 14 to also prevent damage thereto and to frictionally engage said wall.

Device 10 further includes bicycle supports 50 which are secured to either vertical member 16 or elongated vertical portion 42. Such securement is effected by support 49 comprising a collar 52 which slidably receives vertical member 16 and elongated vertical portion 42 therein. A winged screw 54 is screwed into a threaded hole 56 in collar 52 to frictionally engage either vertical member 16 or elongated vertical portion 42 to hold collar 52 in a desired position.

Extending parallel to and positioned between support legs 30 are arms 51 comprising, in this embodiment, a pair of support arms 58 which are mounted to collar 52 of each bicycle support 50. Support arms 58 are shorter than support legs 30. The distal end of each support arm 58 further has a holding member 60 whose upper surface is formed into an arcuate groove 62 of sufficient size to receive a bicycle tubular frame member. The grooves 62 of each pair of support arms 58 are generally coaxial and are preferably provided with a rubber cover 64 to prevent scratching of the bicycle frame as well as provide frictional engagement therewith In the illustrated embodiment, each pair of support arms 58 are formed from a single piece of solid round bar which is provided with an arcuate center groove 66 which groove conforms to and is welded to collar 52.

Figure 5:
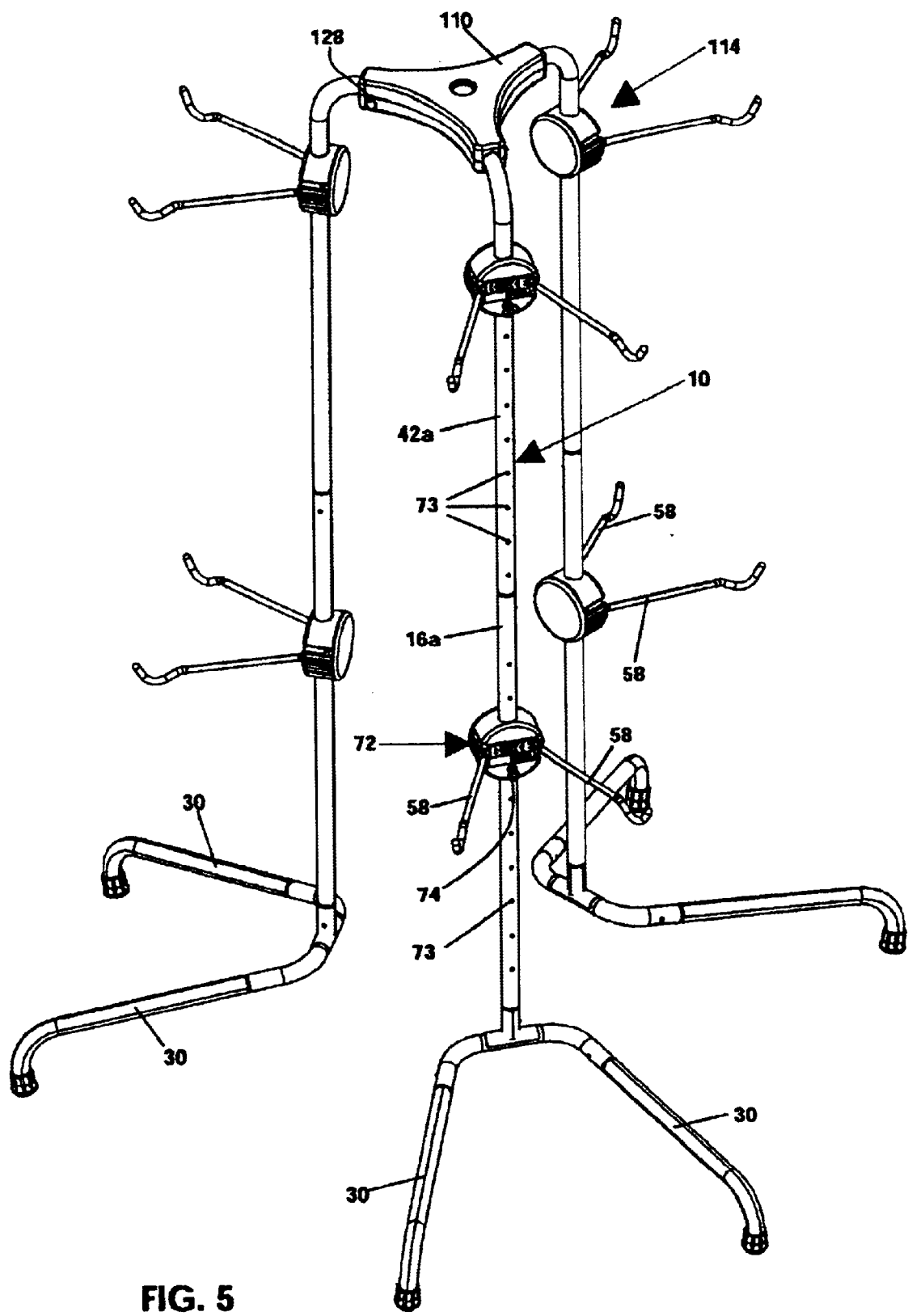
FIG. 5 is a perspective view of an alternate embodiment of the support structure utilizing three modules which is adapted to be free standing.
Figure 8:
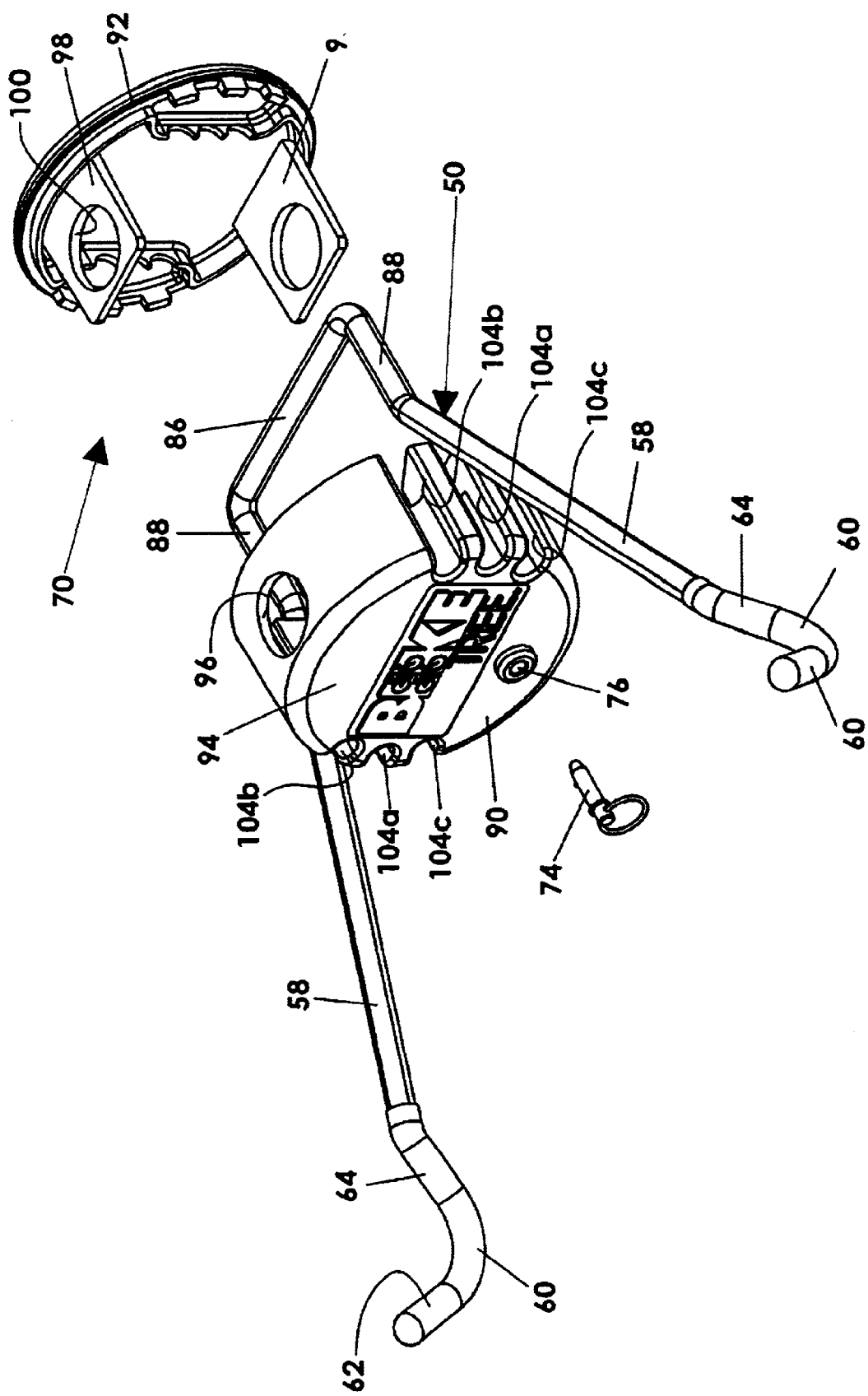
FIG. 8 is an exploded front and top perspective view of a hub used in the embodiment of FIG. 5.

An alternate embodiment shown in FIGS. 5 and 8 utilizes one or more variant bicycle supports 70 which are secured to either vertical member 16 or elongated vertical portion 42. Such securement is effected wherein support 70 comprises a hub 72 which slidably receives vertical member 16a and elongated vertical portion 42a therein. A quick release pin 74 is inserted into a hole 76 in hub 72 and engages with one of a plurality of mating holes 73 provided in either a vertical member 16a or an elongated vertical portion 42a.

In the embodiment of FIGS. 5 and 8, parallel to and positioned between support legs 30 are support arms 58 which are mounted to hub 72 of each bicycle support 50 as described in more detail below.

That portion of support arms 58 which extends through hub 72 are formed from a single piece of solid round bar which is provided with an straight center 86 having two short straight parallel sides 88 extending laterally from said center 86. Support arms 58 extend as previously described in connection with FIGS. 1–3 from the distal end of sides 88.

As best seen in FIG. 8, hub 72 preferably comprises a front section 90 and a rear section 92 with center 86 captured therebetween. In the preferred embodiment, front section 90 is shaped as a cylinder shaped having a sidewall 93 and a disk 94 covering one end thereof and an open end 95. Those skilled in the art will recognize that the many other shapes are possible for hub 72 and its components. On opposing sides of front section 90, two openings 96 are provided which are adapted to slidably receive vertical member 16a and elongated vertical portion 42a therein.

Rear section 92, in the illustrated embodiment, is disk shaped and sized to cover open end 95 of front section 90. Two parallel tabs 98 extend laterally from opposing sides of rear section 92 and have openings 100 therethrough which are adapted to slidably received vertical member 16a and elongated vertical portion 42a therein. When rear section 92 engages front section 90, tab openings 100 align with openings 96 to slidably receive vertical member 16 and elongated vertical portion 42 therein.

To easily align rear section 92 and front section 90, two parallel walls 102 extend from each side of an opening 96 across the interior of front section 90 to the corresponding side of opposing opening 96. Walls 102 are positioned and sized to receive tabs 98 therebetween.

To secure support arms 58 to hub 72, at least one pair of grooves 104 are provided positioned 180 degrees from each other along the periphery of sidewall 93. Grooves 104 are adapted to receive sides 88 of a single pair of support arms 58 from one bicycle support 50. In the preferred embodiment, three pairs of grooves 104 are provided, one pair 104a at 90 degrees from openings 96 and 100, the other two pairs 104b and 104c, aligned at an acute angle to the 90 degree pair. The latter two pairs 104b and 104c are angled to receive those bicycles which have an angled frame (i.e. women's bicycles).

Figure 9:
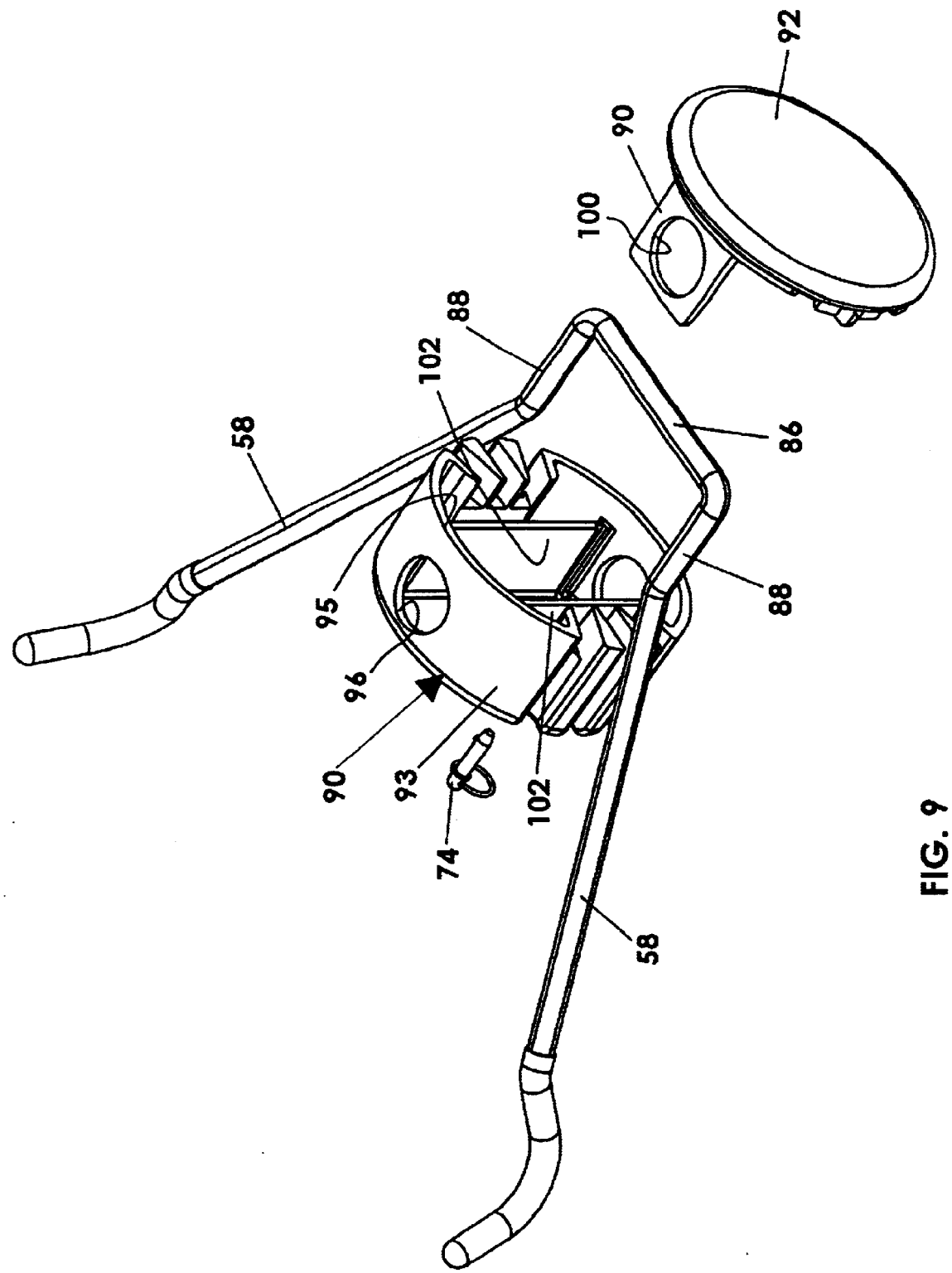
FIG. 9 is an exploded rear and top perspective view of the hub of FIG. 8.

To use the alternate embodiments of FIGS. 5, 8 and 9, hub 72 is assembled with bicycle support 50 positioned between front section 90 and rear section 92. The user positions sides 88 as desired in a selected pair of grooves 104 and then hub 72 is slid over vertical member 16a or elongated vertical portion 42a and positioned as desired. Quick release pin 74 is inserted into hole 76 and one of the mating plurality of holes 73 and the device is ready to receive a bicycle. Removal and insertion of quick release pin 74 allows a user to slide or secure hub 72 to a desired vertical location as needed.

When assembled as shown in FIG. 1, the weight of the bicycles (shown in shadow) is between vertical member 16 and foot portions 36. Since the weight in that position, device 10 is urged towards wall 14 by a rotation about foot portions 36. Wall brace portion 46 prevents such rotation but the force generated secures device 10, and its bicycles, fimly in position.

The use of snaps 19a and wing screws 54 or quick release pins 74 allows device 10 to be quickly set up and torn down as needed.

Figure 10:
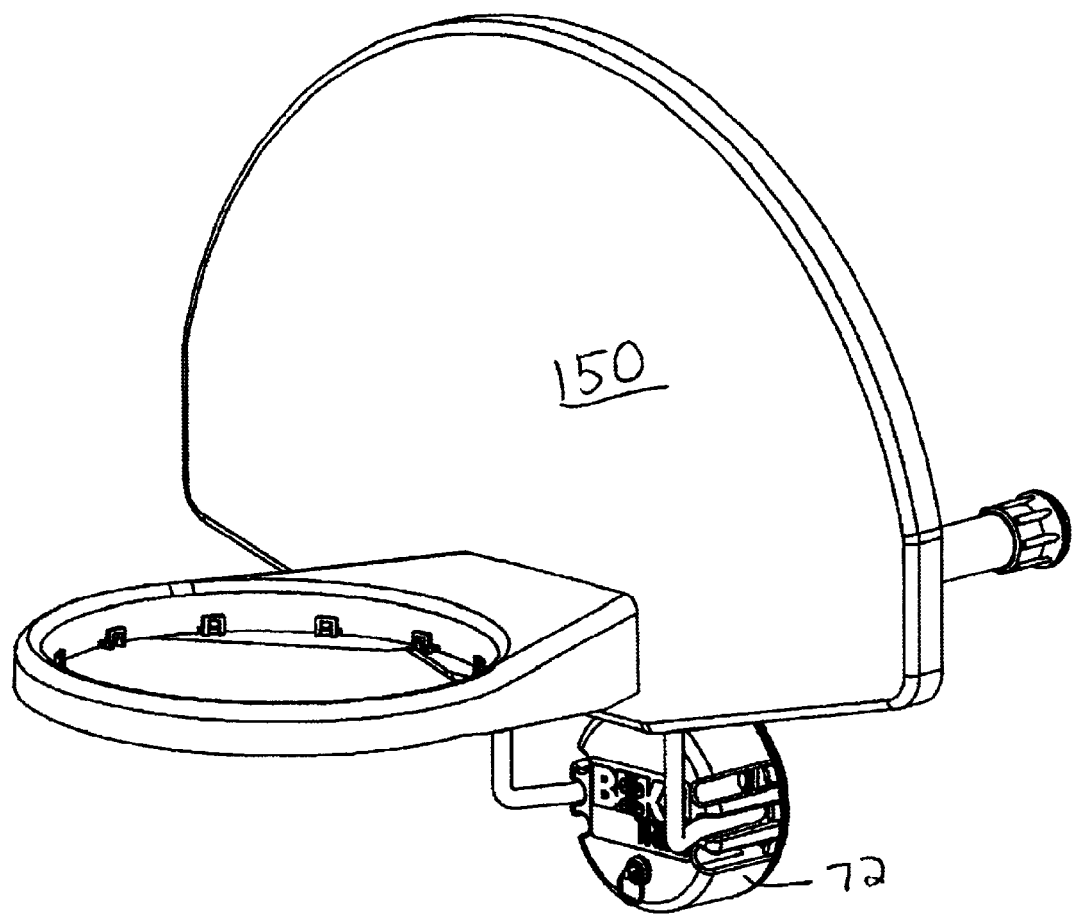
FIG. 10 is a perspective view of the hub supporting a basketball hoop.
Figure 11:
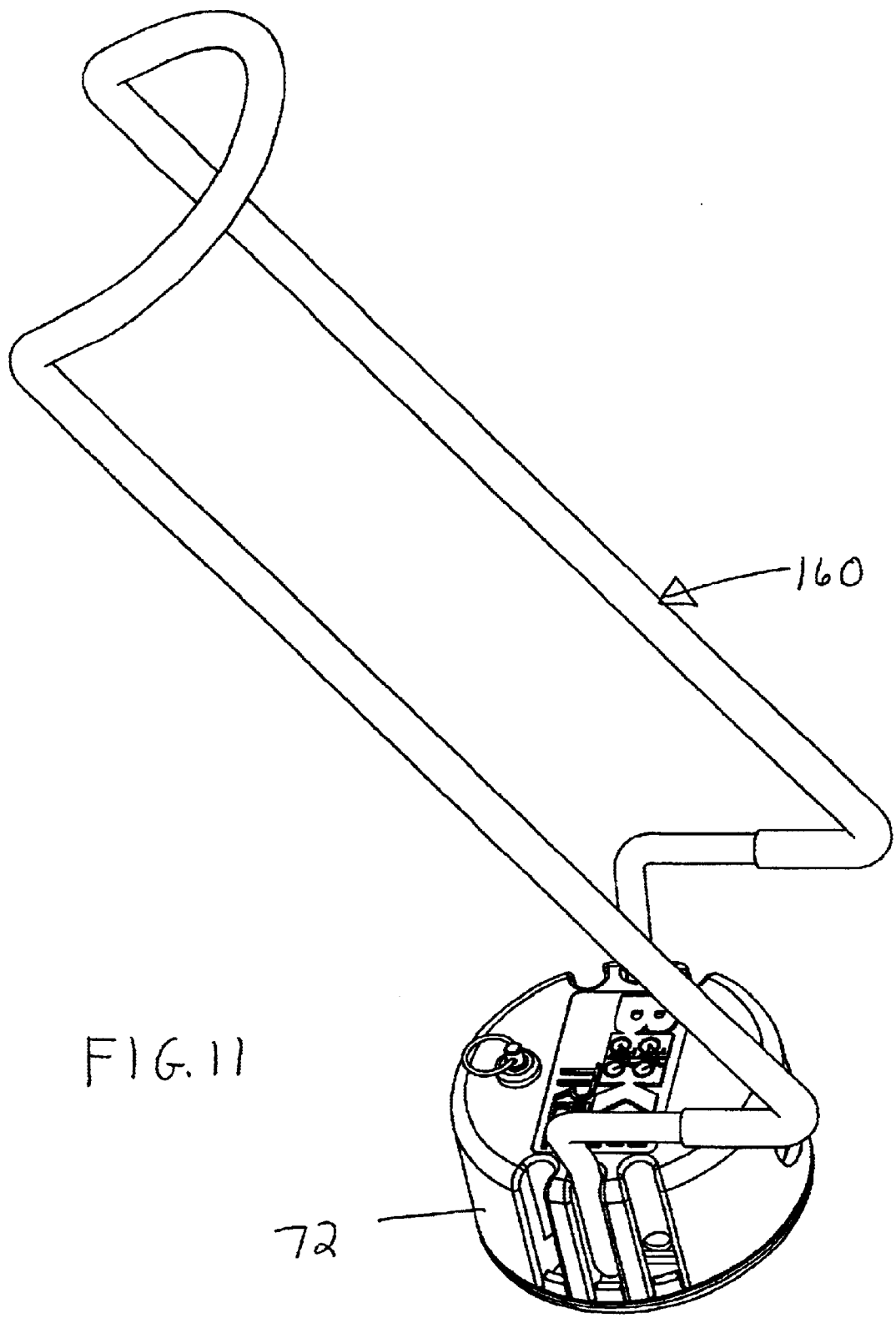
FIG. 11 is a perspective view of the hub supporting a canoe or kayak support device.

One advantage of the use of hub 72 is the ability to utilize a plurality of supports 70. By way of example, in FIG. 10 a basketball hoop 150 is shown mounted to hub 72 while in FIG. 11, a boat hook device 160 suitable for mounting kayaks or canoes is mounted to hub 72. Those skilled in the art will recognize that many almost any item can be suspended from device 10 as described, including, but not limited to, shelving, luggage, clothing and the like.

Figure 6:
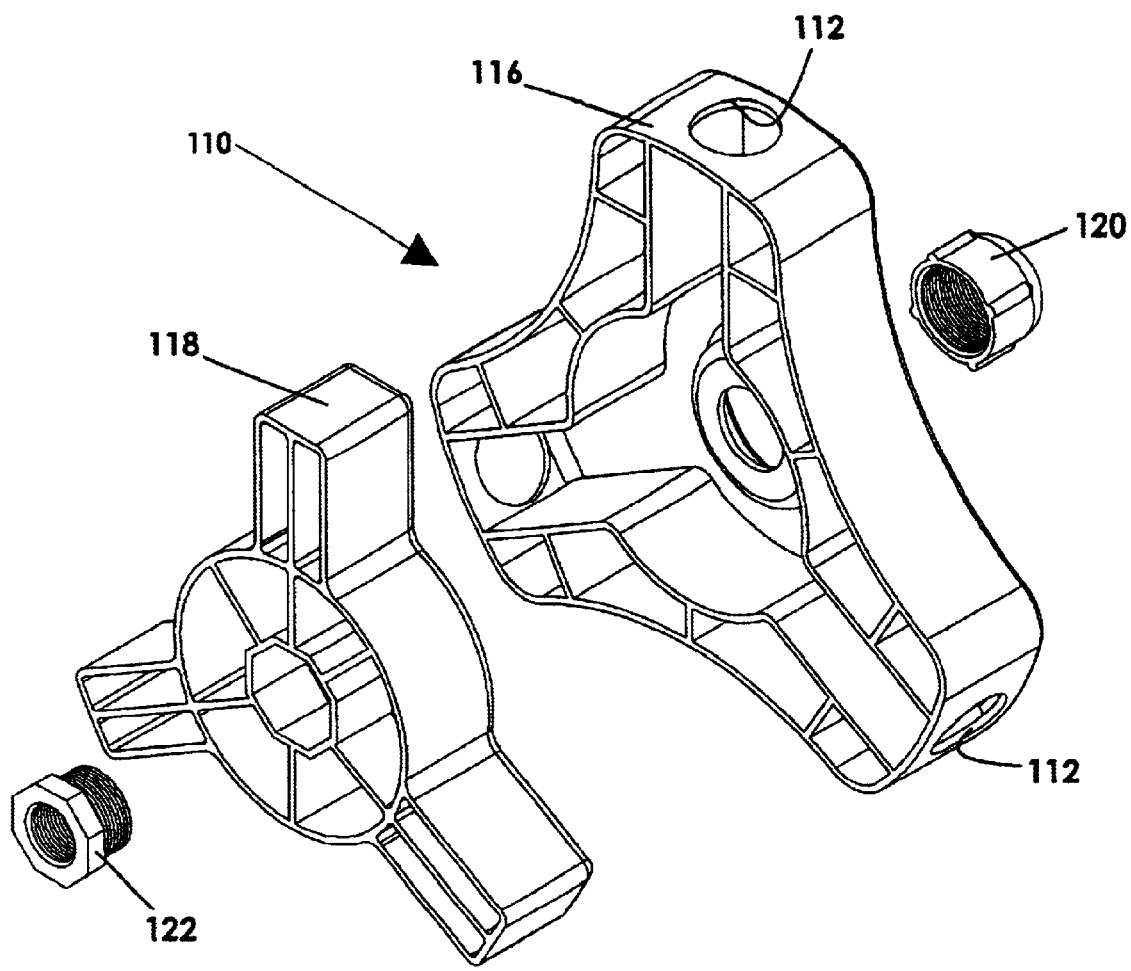
FIG. 6 is an exploded view of one embodiment of a center connector for the free standing embodiment of FIG. 5.
Figure 7:
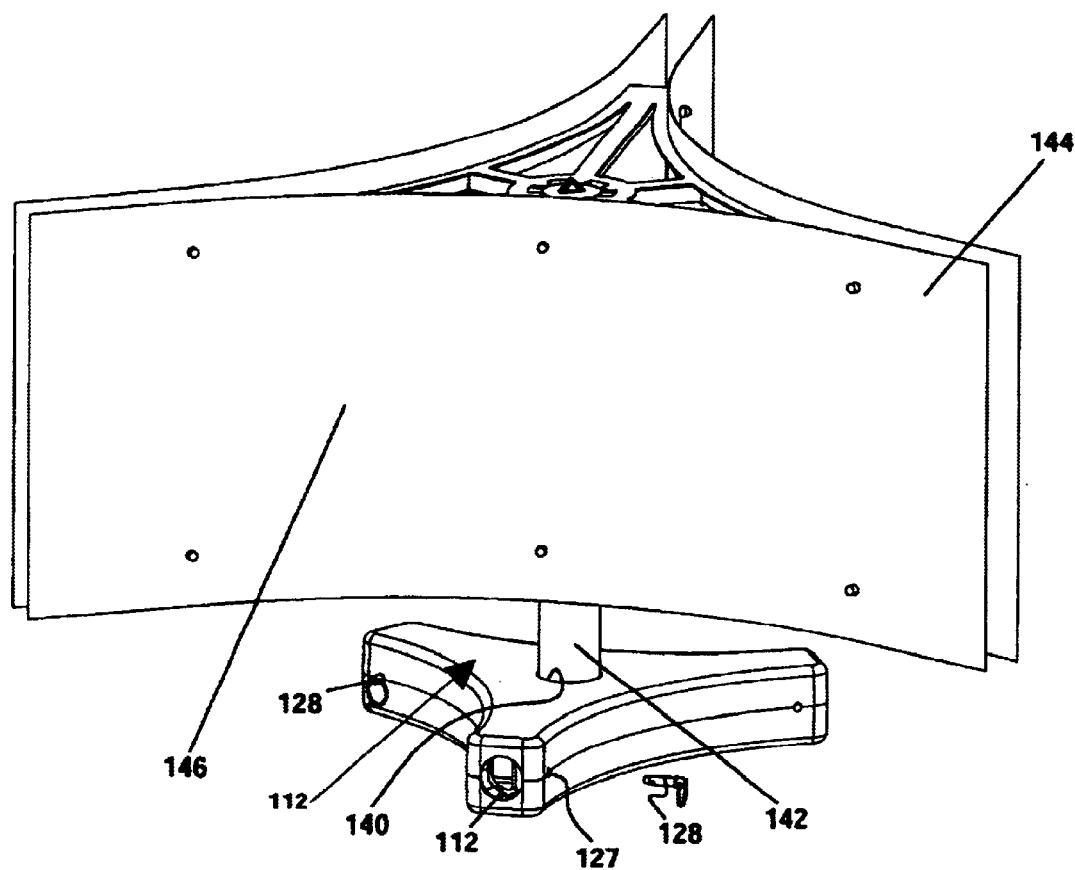
FIG. 7 is a perspective view of another embodiment of the center connector for the free standing embodiment of FIG. 5.

In an alternate embodiments best seen in FIGS. 5–7, a center connector 110 is provided with openings 112. Openings 112 are adapted to receive wall brace portion 46. In the illustrated and most preferred embodiments, three openings aligned at 120 degrees from each other are provided whereby three devices 10 can be secured to each other to provide a free standing bicycle support structure 114. Those skilled in the art will recognize that other embodiments using two or four devices 10 are possible, though with some modifications, namely, lengthening wall brace portion 46 in the four device 10 variation to avoid having bicycles interfere with one another in that embodiment.

As illustrated in FIG. 6, in one embodiment center connector 110 is constructed using an upper piece 116 secured to a lower piece 118 by a nut 120 and bolt 122 combination. However, in the presently preferred embodiment shown in FIG. 7, center connector 110 is a one piece unit. Further, in this embodiment, holes 127 are formed in center connector 110 which area adapted to receive quick release pins 128. Holes 127 are positioned proximate to openings 112 and align with corresponding holes formed in the end of wall brace portion 46 received within openings 112. Quick release pins 128 provide additional stability by preventing an accidental disengagement, as, for example, when removing a bicycle from device 10.

Lastly, the use of center connector 110 is favored in, for example, retail stores for display of bicycles. In one shown in FIG. 7, a hole 140 is provided in the middle of center connector 112 which is adapted to receive a post 142 having a banner 144 mounted thereon for display purposes. Banner 144 includes indicia 146 having, for exemplary purposes only, advertising messages contained thereon.

Although certain embodiments have been illustrated and described, it will be apparent to those skilled in the art that various changes and modifications may be made therein without departing from the spirit of the invention or from the scope of the appended claims.

What is claimed is:

1. A modular storage support system for supporting a plurality of items suspended above a floor, the system comprising:

three modular storage support devices, each of the three modular storage support devices comprising:
a vertical member extending upwardly, the vertical member having an upper end and a lower end,
a base member having a base vertical portion telescopically and releasably receiving the lower end of one of the vertical member, and a U-shaped portion oriented perpendicular to the vertical member, the U-shaped portion having two leg portions extending laterally at an angle with respect to a line perpendicular to the vertical member,
two L-shaped support legs, each of the L-shaped support legs having a horizontally oriented elongated portion telescopically and releasably received in one of the leg portions and extending forward therefrom, each of the L-shaped support legs having afoot portion extending downwardly from the elongated portion of each opposite the leg portion and adapted to rest upon a floor,
an L-shaped brace having an elongated vertical portion telescopically and releasably received within the upper end and extending upwardly from one of the vertical member and a brace portion extending rearward from the elongated vertical portion, and
at least one supports which are adapted to be secured to the vertical member and the elongated vertical portion, each support adapted to slidably receive the vertical member and the elongated vertical portion, the at least one supports having means for releasably securing the at least one supports to the vertical member and the elongated vertical portion, at least one support arm being mounted each of the at least one supports, each of the at least one support arms being parallel to, shorter than and positioned above and between the support legs, each of the at least one support arms adapted to engage an item for support of said item, and
a center connector, the center connector adapted to engage three of the wall portions at 120 degrees from the other of the three wall portions whereby the each of the three modular storage support devices rest upon the floor and the other two of the three modular storage support devices.

2. The device of claim 1 further comprising quick release pins, the center connector further includes holes aligned with holes in each of the at least two brace portions, the quick release pins adapted to engage the center connector holes and the brace portion holes to secure said center connector to said at least two brace portions.

* * * * *